(12) United States Patent
Chang et al.

(10) Patent No.: US 7,623,770 B2
(45) Date of Patent: Nov. 24, 2009

(54) FAN CONTROL SYSTEM

(75) Inventors: Sheng-Hsiung Chang, Taipei (TW); Chi-Chun Chen, Taipei (TW); Yu-Chin Chen, Taipei (TW)

(73) Assignee: Asustek Computer Inc., Taipei (TW)

( * ) Notice: Subject to any disclaimer, the term of this patent is extended or adjusted under 35 U.S.C. 154(b) by 196 days.

(21) Appl. No.: 11/806,770

(22) Filed: Jun. 4, 2007

(65) Prior Publication Data

US 2007/0292116 A1 Dec. 20, 2007

(30) Foreign Application Priority Data

Jun. 6, 2006 (TW) ................................. 95120099
May 25, 2007 (TW) ................................. 96118864

(51) Int. Cl.
*H02P 7/29* (2006.01)
*H02P 7/00* (2006.01)

(52) U.S. Cl. .................... 388/811; 388/822; 318/268; 318/471

(58) Field of Classification Search ............ 318/400.08, 318/400.11, 400.14, 254, 268, 434, 473, 318/66, 471, 479; 388/811, 822
See application file for complete search history.

(56) References Cited

U.S. PATENT DOCUMENTS

| | | | | |
|---|---|---|---|---|
| 6,798,162 | B2 * | 9/2004 | Makaran et al. | 318/442 |
| 7,199,542 | B1 * | 4/2007 | Chen | 318/473 |
| 7,205,733 | B2 * | 4/2007 | Xiong et al. | 318/400.11 |
| 7,218,846 | B2 * | 5/2007 | Wu et al. | 318/400.14 |
| 7,221,858 | B2 * | 5/2007 | Ku | 318/400.08 |
| 7,323,836 | B2 * | 1/2008 | Lin et al. | 318/268 |
| 7,447,423 | B2 * | 11/2008 | Chiu et al. | 388/822 |
| 2004/0247449 | A1 * | 12/2004 | Ma et al. | 417/42 |
| 2005/0040778 | A1 * | 2/2005 | Lin et al. | 318/268 |
| 2006/0043950 | A1 * | 3/2006 | Lin et al. | 323/282 |
| 2006/0066276 | A1 * | 3/2006 | Koch et al. | 318/434 |
| 2006/0076912 | A1 * | 4/2006 | Yang et al. | 318/254 |
| 2006/0091837 | A1 * | 5/2006 | Xiong et al. | 318/254 |
| 2007/0096669 | A1 * | 5/2007 | Chang et al. | 318/276 |
| 2007/0108923 | A1 * | 5/2007 | Chen | 318/66 |
| 2007/0120510 | A1 * | 5/2007 | Wang | 318/268 |
| 2007/0216345 | A1 * | 9/2007 | Kanamori | 318/814 |
| 2007/0224030 | A1 * | 9/2007 | Chang et al. | 415/47 |
| 2008/0012429 | A1 * | 1/2008 | Dung et al. | 307/130 |

* cited by examiner

*Primary Examiner*—Paul Ip
(74) *Attorney, Agent, or Firm*—Birch, Stewart, Kolasch & Birch, LLP

(57) ABSTRACT

A fan control system includes a power source, a switch control circuit, a switch control signal delivering unit and a fan circuit module. The power source outputs a nominal power, the switch control circuit electrically connects to the power source, the switch control signal delivering unit electrically connects to the switch control circuit and can send a power control signal to the switch control circuit, and the fan circuit module electrically connects to the switch control circuits. In an initial operation state, the nominal power output from the power source can be reduced to a control power sending to the fan circuit module via the switch control circuit to drive at least one fan within the fan circuit module, and then the power control signal controls the control power after the switch control signal delivering unit sends the power control signal to the switch control circuit.

14 Claims, 6 Drawing Sheets

FAN CONTROL SYSTEM

FIELD OF THE INVENTION

The present invention relates to a fan control system, and more particularly to a fan control system can reduce the noise generated from the system operation when the fan control system operates under an initial operation state.

BACKGROUND OF THE INVENTION

Among all general electronic devices, the most of them are provided with a heat-dissipating system for decreasing the high temperatures generated under the operation state, so as to upgrade the integral operation efficiency. More particularly to the computer devices, for effectively upgrading the operation efficiencies of all electronic components within the computer devices, the most of the computer devices are provided with a fan and a thermal module. The thermal module is applied to absorb heat generated from the electronic components by heat-conduction under the operation state, and then the fan can rotate to generate convectional airflows, so as to dissipate heat, which is absorbed by the thermal module, to the external environment via the airflow.

For example, when the present computer system is under an initial operation state, such as a booting state, a power supply directly supplies the power for driving the fan, and then the computer system starts to monitor the power supplied for driving the fan after an initialization setting of a basic input/output system (BIOS) is completed. However, the conventional power supply usually sends out a nominal power in a high voltage of 12V, so that the fan operates in a higher rotation speed and generates more noise in the initial operation state.

Following up, above description is further combined with a drawing for progressive illustration. Please refer to FIG. 1, which illustrates a functional block diagram of a conventional fan control system applied to a computer system. As shown in FIG. 1, a fan control system 1 is applied to a computer system, and comprises a power source 11, a fan circuit module 12 and a monitoring unit 13.

The power source 11 electrically connects to the fan circuit module 12, so as to output a nominal power to the fan circuit module 12 for driving a fan (not shown in FIG. 1) therein. The monitoring unit 13, usually being the BIOS, electrically connects to the fan circuit module 12 for monitoring the operation of the fan, and sends a control signal S1 to the fan circuit module 12 according to a monitoring result monitored from the monitoring unit 13, so as to control the rotation of the fan.

When the computer system is under an initial operation state, i.e. under a booting state, the power for driving the fan must be directly supplied by the nominal power output from the power source 11. Due to that the nominal power usually is usually provided in a relative high voltage of 12V, the fan is driven to operate in an extremely high rotation speed and generates a louder noise. Meanwhile, under the operation state of the fan, monitoring unit 13 continuously monitors the operation of the fan and continuously sends the control signal S1 to the fan circuit module. However, in practice applications, it is necessary to go through a steady-time period to make the control signal S1 sent from the monitoring unit 13 control the fan to steadily operate in a relative low rotation speed, so as to reduce noise generated from the fan.

SUMMARY OF THE INVENTION

From the prior art as mentioned, the louder noise is generated from the fan under the initial operation state, therefore, it is necessary to go through a steady-time state to make the control signal sent from the monitoring unit control the fan to steadily operate in a relative low rotation speed, so as to reduce the noise generated from the fan.

Thus, the primary objective of the present invention provides a fan control system. Under the initial operation state, the control system can reduce the nominal power, output from the power source, to a control power, and then the control power is used to drive the fan operating in a relative low rotation speed.

The secondary objective of the present invention provides a fan control system. Under the initial operation state, the control power is used to drive the fan. Meanwhile, a power control signal is continuously sent and used to control the control power.

Means of the present invention for solving the problems as mentioned above provides a fan control system. The fan control system comprises a power source, a switch control circuit, a switch control signal delivering unit and a fan circuit module, wherein the power source outputs a nominal power; the switch control unit electrically connects to the power source; the switch control signal delivering circuit electrically connects to the switch control circuit for sending a power control signal to the switch control circuit; and the fan circuit module electrically connects to the switch control circuit.

The nominal power output from the power source can be reduced to a control power, and then the control power can be sent to the fan circuit module to drive at least one fan therein. The power control signal can control the control power after being sent from switch control signal delivering unit to the switch control circuit.

From above description, with reference to the prior, the fan control system of the present invention firstly reduces the nominal power to the control power, and then uses the control power to drive the fan. Thus, under the initial operation state, the nominal power provided in relative high voltage does not directly drive the fan any more, so that the present invention can effectively reduce the noise generated from the fan.

Nevertheless, the switch control signal delivering unit can continuously send the power control signal to the switch control circuit, therefore, no matter under the initial operation state or any operation state thereafter, the power control signal always can effectively control the control power, so as to ensure that the fan would not suddenly operate in extremely high rotation speed to make any louder noise in any instant.

The devices, characteristics, and the preferred embodiment of this invention are described with relative figures as follows.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Due to that the fan control system in accordance with the present invention can be widely applied to any system, device, or apparatus provided with one or more fans, such as a computer system, a cooling system, or the air condition system, etc., the combined applications are too numerous to be enumerated and described, so that only a preferred embodiment and two applications extended therefrom are disclosed as follows for representation.

Figure 1:
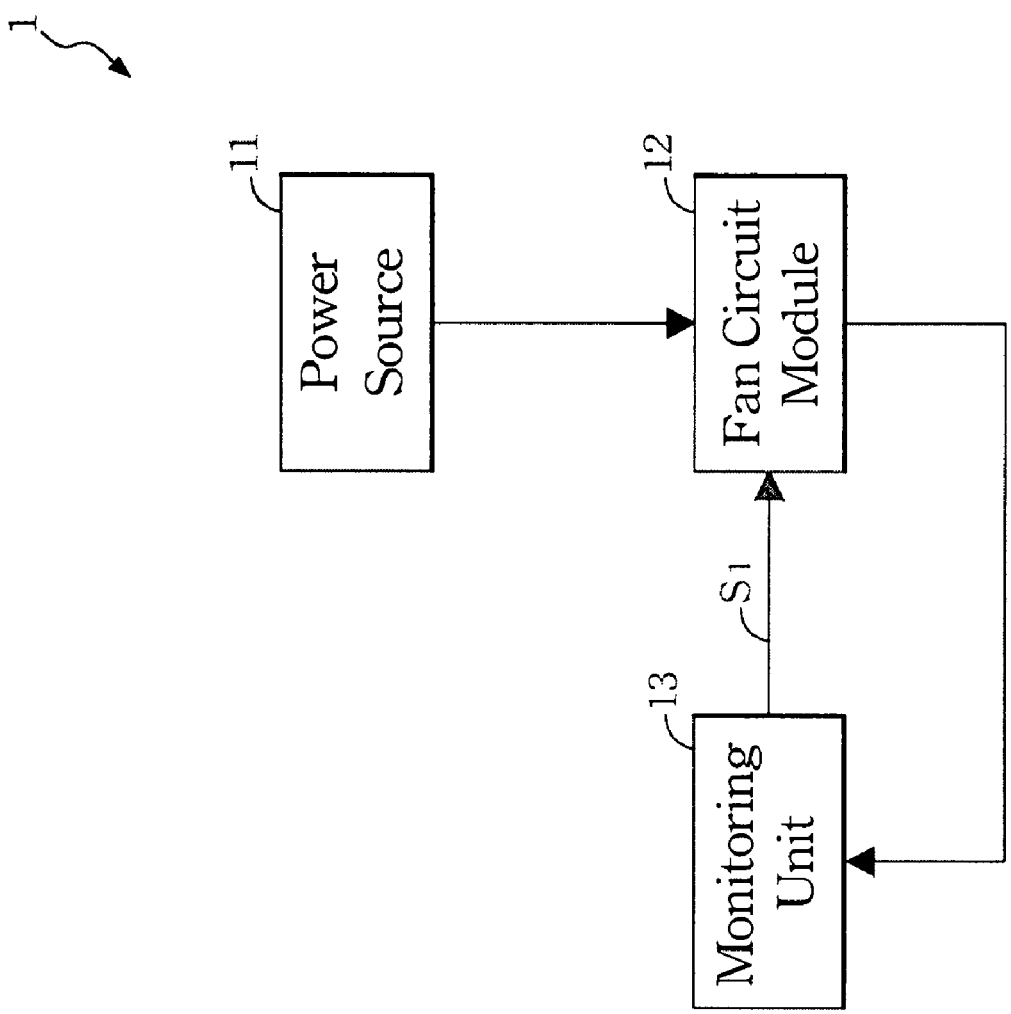
FIG. 1 illustrates a functional block diagram of a conventional control system for fan applied to a computer system.
Figure 2:
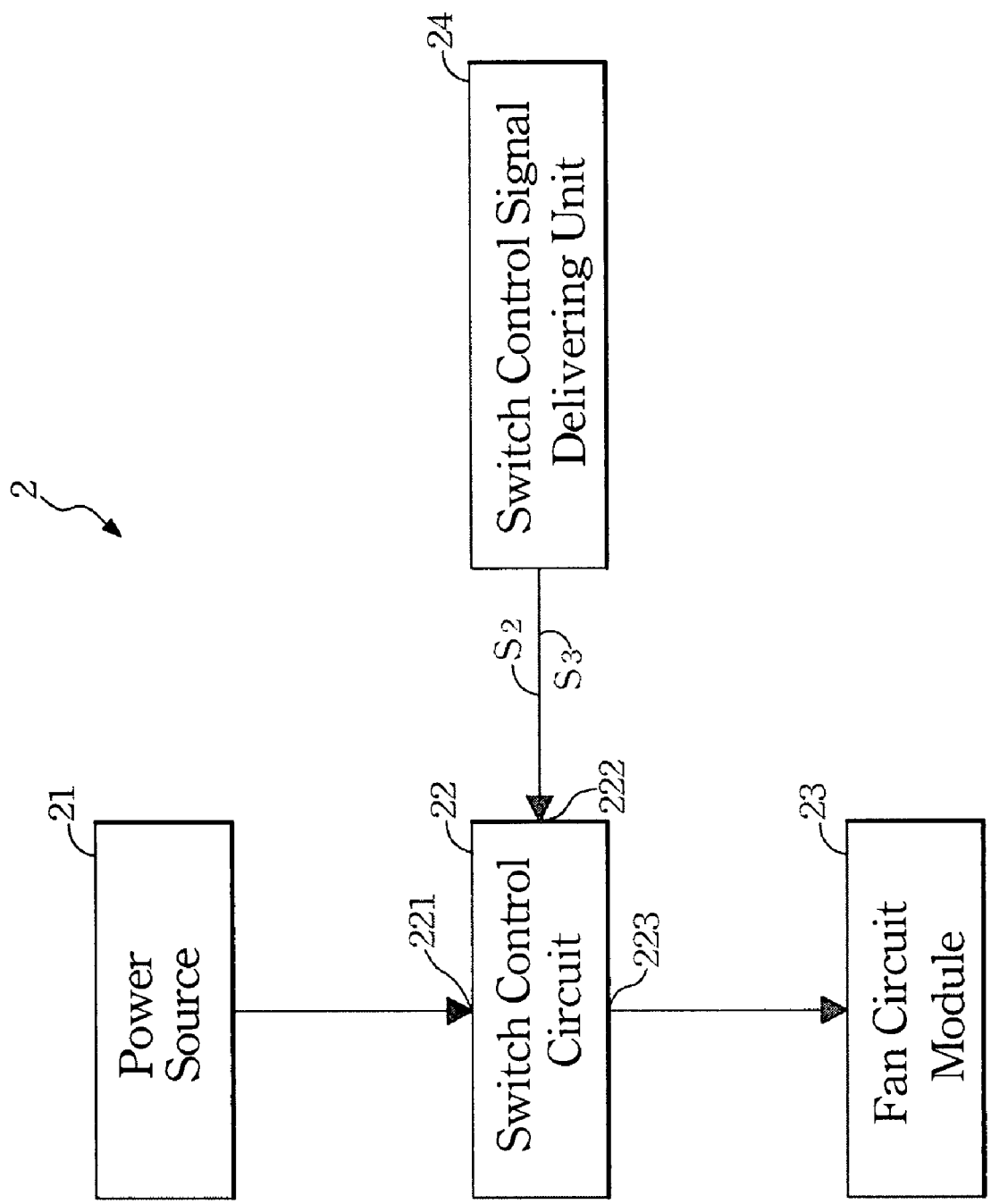
FIG. 2 illustrates a basic electrical-function block diagram of a preferred embodiment of the present invention.

Please refer to FIG. 2, which illustrates a basic electrical-function block diagram of a preferred embodiment of the present invention. As shown in FIG. 2, a fan control system 2 comprises a power source 21, a switch control circuit 22, a fan circuit module 23 and a switch control signal delivering unit 24. The power source 21 can be a power supply, and the switch control circuit 22 respectively connects to the power source 21, the fan circuit module 23 and the switch control signal delivering unit 24.

When the fan control system 2 runs to an initial operation state, the power source 21 outputs a nominal power to the switch control circuit 22. The switch control circuit 22 can reduce the nominal power to a control power, and then sends the control power to the fan circuit module 23, so as to drive at least one fan (not shown) within the fan circuit module 23.

When the fan control system 2 run to an initial operation state, an initialization setting of the switch control signal delivering unit 24 is simultaneously in progress. After the initialization setting of the switch control signal delivering unit 24 is completed, the switch control signal delivering unit 24 can send a power control signal S2 to the switch control circuit 22, so as to modulate and control the control power sent to the fan circuit module 23.

People skill in the related arts can easily realize that, comparing the present invention with the prior art, in the initial operation state, the nominal power output from the power source 21 can be reduced to the control power sending to the fan circuit module 23 via the switch control circuit 22, so as to drive the fan (not shown) within the fan circuit module 23. Thus, the fan does not immediately operate in an extremely high rotation speed to make louder noise in the initial operation state.

For providing more detail description of the present invention, two applications extended from the preferred embodiment of the present invention are further disclosed as follows. Firstly, please refer to FIG. 3 and FIG. 4, wherein FIG. 3 illustrates an electrical-function block diagram in accordance with the first application of the preferred embodiment of the present invention, and FIG. 4 illustrates the main circuit diagram in accordance with the first application, with respect to FIG. 3, of the preferred embodiment of the present invention.

Figure 3:
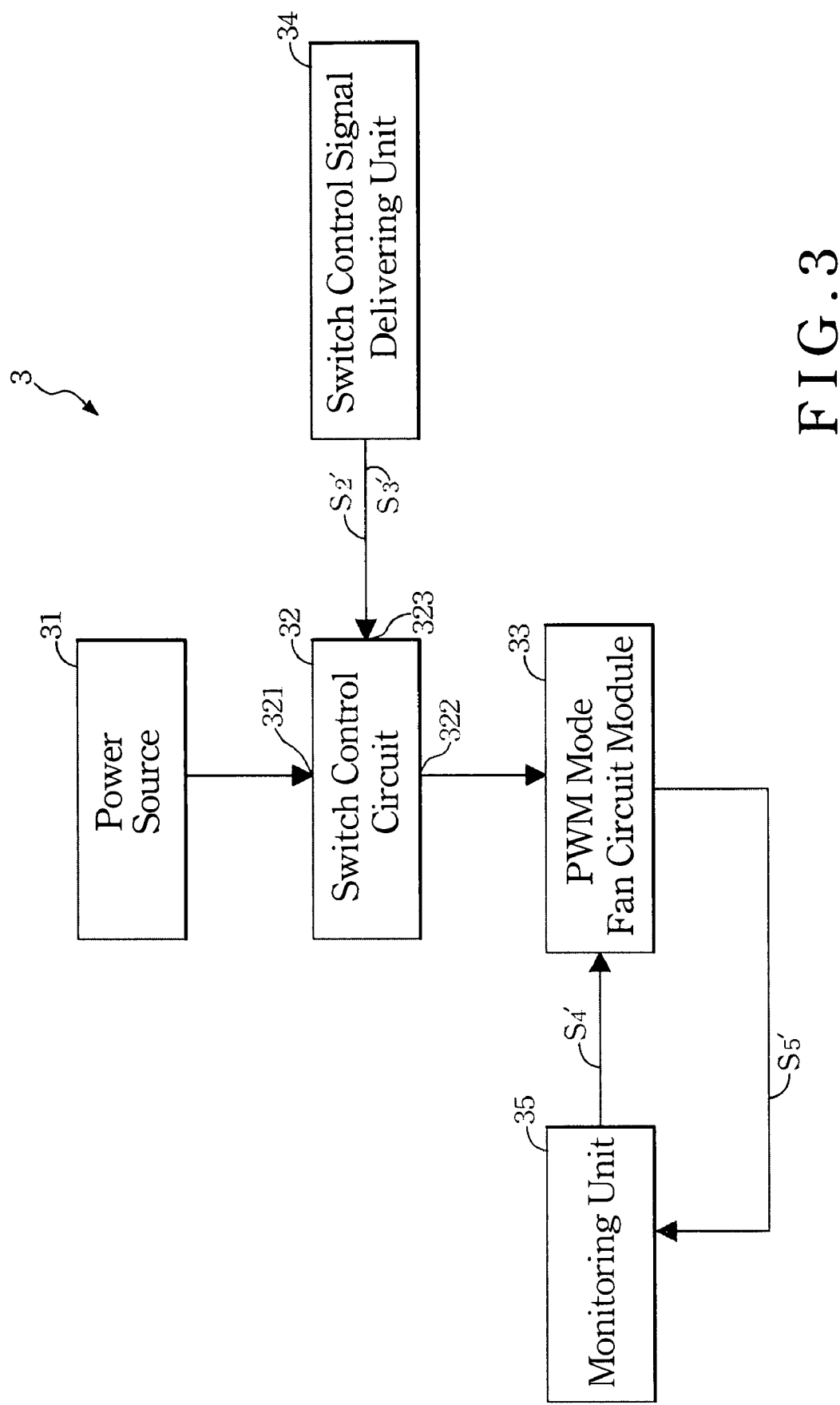
FIG. 3 illustrates an electrical-function block diagram in accordance with the first application of the preferred embodiment of the present invention.
Figure 4:
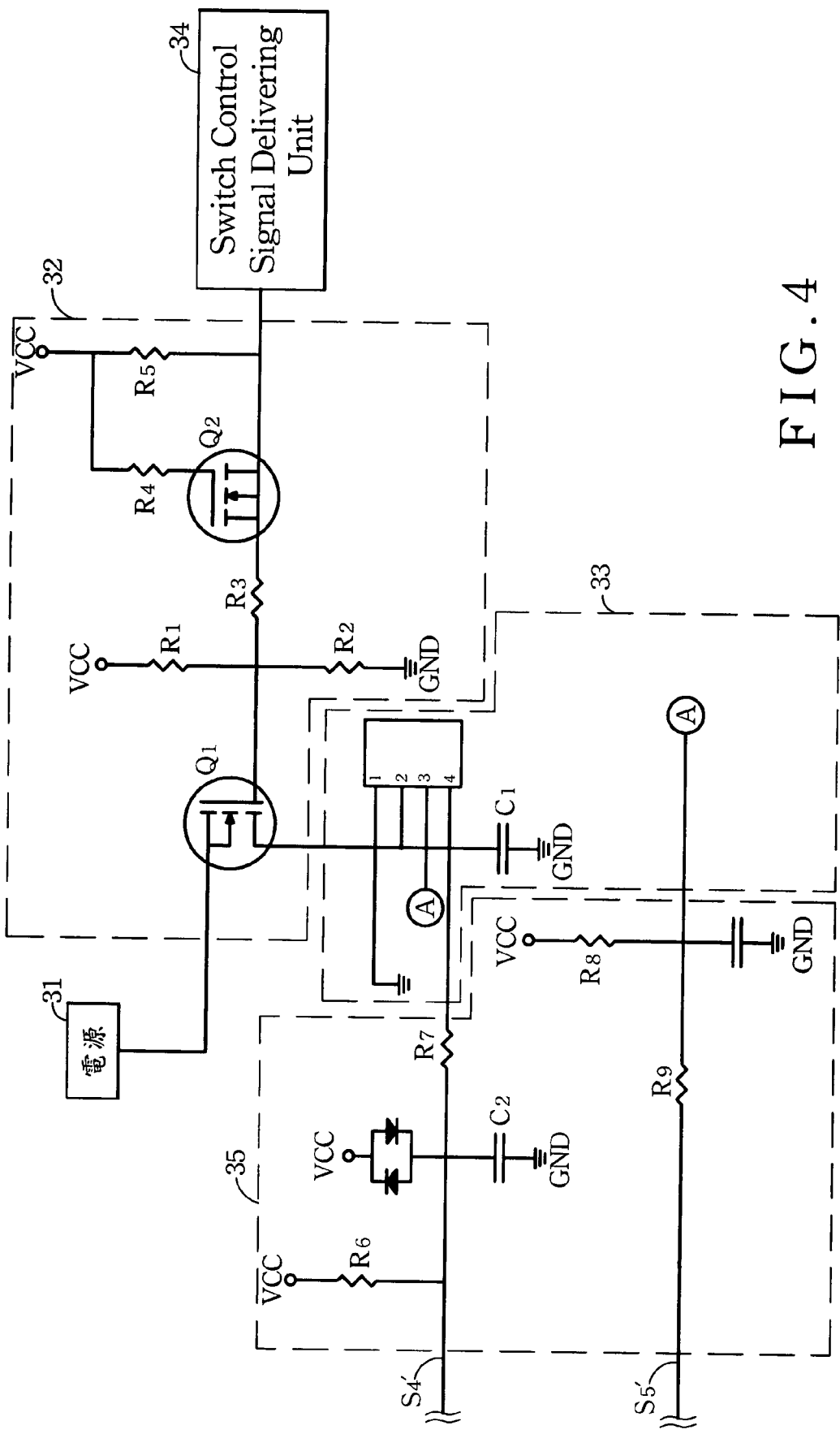
FIG. 4 illustrates the main circuit diagram in accordance with the first application, with respect to FIG. 3, of the preferred embodiment of the present invention.

As shown in FIG. 3 and FIG. 4, a fan control system 3 comprises a power source 31, a switch control circuit 32, a pulse width modulation mode (PWM Mode) fan circuit module 33, a switch control circuit 34 and a monitoring unit 35. The switch control circuit 32 electrically connects to the power source 31. The PWM Mode fan circuit module 33 and the switch control signal delivering unit 34. The monitoring unit 35 electrically connects to the PWM Mode fan circuit module 33.

When the fan control system 3 runs to an initial operation state, the power source 31 outputs a nominal power to the switch control circuit 32. The switch control circuit 32 can reduce the nominal power to a control power, and then sends the control power to the PWM Mode fan circuit module 33, so as to drive at least one fan (not shown) within the PWM Mode fan circuit module 33. At the same time, an initialization setting of the switch control signal delivering unit 34 is simultaneously in progress. After the initialization setting of the switch control signal delivering unit 34 is completed, the switch control signal delivering unit 34 can send a power control signal S3 to the switch control circuit 32, so as to modulate and control the control power sent to the PWM Mode fan circuit module 33.

Similarly, under the initial operation state, an initialization setting of the monitoring unit 35 is simultaneously in progress. After the initialization setting of the monitoring unit 35 is completed, the monitoring unit 35 starts to monitor the operation of the fan and send a control signal S4, according to the monitoring result monitored from the monitoring unit 35, to the PWM Mode fan circuit module 33 to control the operation of the fan therein.

People skilled in the related arts can easily realize that when the control system 3 applied to a computer system, the switch control signal delivering unit 34 usually can comprise a basic input/output system (BIOS) and a basic input/output chipset. The basic input/output chipset hereinafter is defined as any chipset having general purpose input/output (GPIO) pins. In the practice applications, the basic input/output chipset usually is a south bridge.

Moreover, the switch control circuit 32 usually comprises a switch component, which can be a field-effect transistor (FET) or a bipolar junction transistor (BJT), wherein the FET can be a junction field-effect transistor (JFET) or a metal-oxide-semiconductor field-effect transistor (MOSFET).

As shown in FIG. 4, the FET applied to the first application of the preferred embodiment of the present invention is the MOSFET. Therefore, it is able to take advantage of the characteristic within a linear working interval of the MOSFET, and combine the MOSFET with a voltage division circuit, so as to control the opening degree of the switch control circuit 32. In other words, the switch control circuit 32 can modulate and control the control power supplied to the PWM fan circuit module 33, so as to further control the rotation speed of the fan within the PWM fan circuit module 33.

Following up, the second application extended from the preferred embodiment of the present invention will be further disclosed, wherein a direct current mode (DC Mode) fan circuit module is provided to replace the PWM Mode fan circuit module 33 as mentioned in the first application. Please refer to FIG. 5 and FIG. 6, wherein FIG. 5 illustrates an electrical-function block diagram in accordance with the second application of the preferred embodiment of the present invention, and FIG. 6 illustrates the main circuit diagram in accordance with the second application, with respect to FIG. 5, of the preferred embodiment of the present invention.

Figure 5:
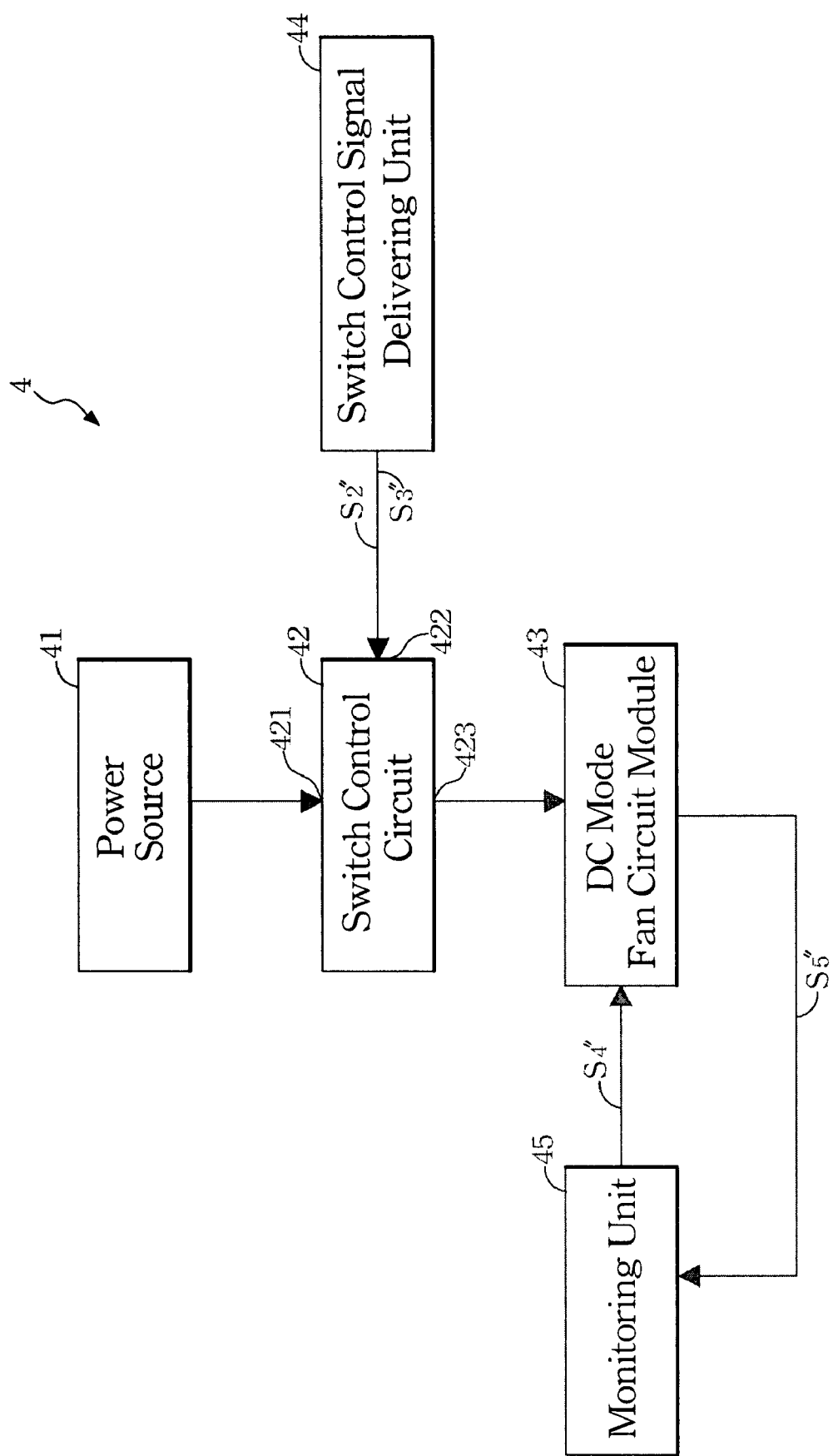
FIG. 5 illustrates an electrical-function block diagram in accordance with the second application of the preferred embodiment of the present invention.
Figure 6:
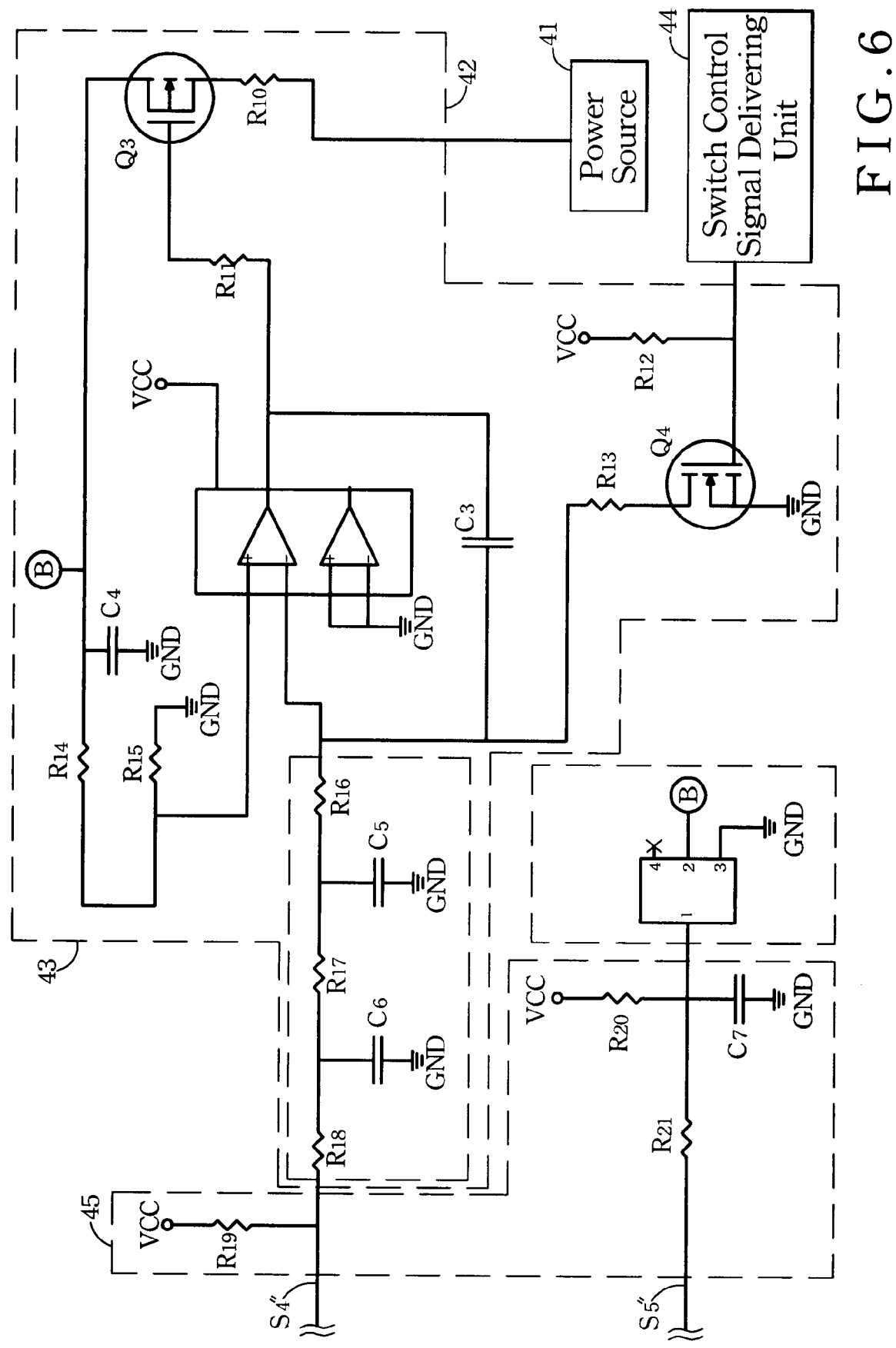
FIG. 6 illustrates the main circuit diagram in accordance with the second application, with respect to FIG. 5, of the preferred embodiment of the present invention.

As shown in FIG. 5 and FIG. 6, a fan control system 4 comprises a power source 41, a switch control circuit 42, a direct current mode (DC Mode) fan circuit module 43, a switch control circuit 44 and a monitoring unit 45. The switch control circuit 42 electrically connects to the power source 41. The DC Mode fan circuit module 43 and the switch control signal delivering unit 44. The monitoring unit 45 electrically connects to the PWM Mode fan circuit module 43.

When the fan control system 4 runs to an initial operation state, the power source 41 outputs a nominal power to the switch control circuit 42. The switch control circuit 42 can reduce the nominal power to a control power, and then sends the control power to the DC Mode fan circuit module 43, so as to drive at least one fan (not shown) within the DC Mode fan circuit module 43. At the same time, an initialization setting of the switch control signal delivering unit 44 is simultaneously in progress. After the initialization setting of the switch control signal delivering unit 44 is completed, the switch control signal delivering unit 44 can send a power control signal S3' to the switch control circuit 42, so as to modulate and control the control power sent to the DC Mode fan circuit module 43.

Similarly, under the initial operation state, an initialization setting of the monitoring unit 45 is simultaneously in progress. After the initialization setting of the monitoring unit 45 is completed, the monitoring unit 45 starts to monitor the operation of the fan and send a control signal S4', according to the monitoring result monitored from the monitoring unit 45, to the DC Mode fan circuit module 43 to control the operation of the fan therein.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fan control system comprising:
   a power source for outputting a nominal power;
   a switch control circuit electrically connecting to the power source;
   a switch control signal delivering unit electrically connecting to the switch control circuit, and the switch control signal delivering unit sending a power control signal to the switch control circuit; and
   a fan circuit module electrically connecting to the switch control circuit;
   wherein the nominal power outputting from the power source is reduced to a control power via the switch control circuit, the control power is sent to the fan circuit module, and then the power control signal controls the control power after being sent from switch control signal delivering unit to the switch control circuit.

2. The fan control system as claimed in claim 1, wherein the fan circuit module is a pulse width modulation mode (PWM Mode) fan circuit module.

3. The fan control system as claimed in claim 2, further comprising a monitoring unit electrically connecting to the PWM Mode fan circuit module for monitoring the PWM Mode fan circuit module to accordingly sending a monitoring signal to control the PWM Mode fan circuit module.

4. The fan control system as claimed in claim 1, wherein the fan circuit module is a direct current mode (DC Mode) fan circuit module.

5. The fan control system as claimed in claim 4, further comprising a monitoring unit electrically connecting to the DC Mode fan circuit module for monitoring the DC Mode fan circuit module to accordingly sending a monitoring signal to control the DC Mode fan circuit module.

6. The fan control system as claimed in claim 1, wherein the switch control signal delivering unit comprises a basic input/output system (BIOS).

7. The fan control system as claimed in claim 1, wherein the switch control signal delivering unit comprises a basic input/output chipset having at least one general purpose input/output (GPIO) pin.

8. The fan control system as claimed in claim 7, wherein the basic input/output chipset is a south bridge.

9. The fan control system as claimed in claim 1, wherein the switch control circuit comprises a switch component.

10. The fan control system as claimed in claim 9, wherein the switch component is a field-effect transistor (FET).

11. The fan control system as claimed in claim 10, wherein the FET is a junction field-effect transistor (JFET).

12. The fan control system as claimed in claim 10, wherein the FET is a metal-oxide-semiconductor field-effect transistor (MOSFET).

13. The fan control system as claimed in claim 9, wherein the switch component is a bipolar junction transistor (BJT).

14. The fan control system as claimed in claim 1, wherein the power source is a power supply.

* * * * *